April 1, 1958   A. J. HIRST   2,828,958
INDEPENDENT WHEEL SUSPENSION
Filed March 28, 1955
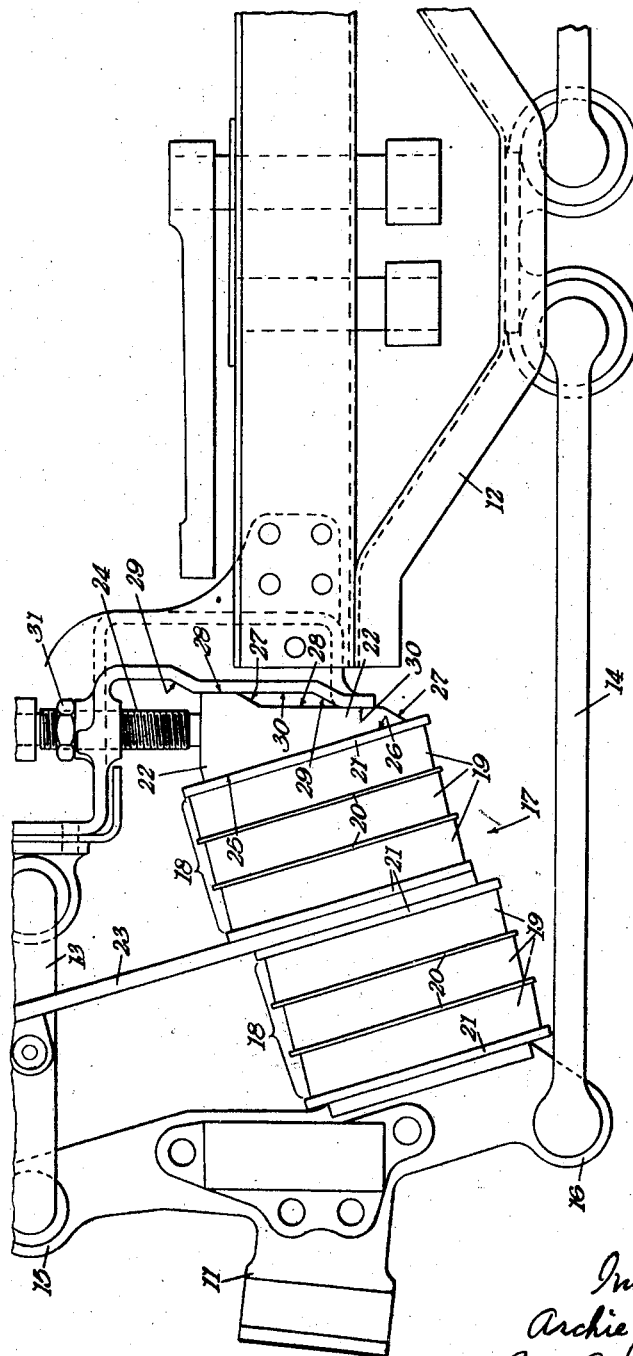
Inventor
Archie J. Hirst
By Ralph B. Stewart
Attorney

United States Patent Office 2,828,958
Patented Apr. 1, 1958

2,828,958

INDEPENDENT WHEEL SUSPENSION

Archie John Hirst, Leicester, England, assignor to Metalastik Limited, Leicester, England, a corporation of Great Britain Application March 28, 1955, Serial No. 497,295

Claims priority, application Great Britain April 30, 1954

5 Claims. (Cl. 267—21)

This invention relates to independent suspension of the wheels of vehicles such as motor vehicles; and more particularly to an independent suspension in which a wheel-hub-carrying member is carried by a linkage pivoted both to said member and the superstructure of the vehicle and in which a rubber sandwich is interposed between the superstructure and said member.

The present invention consists in such an independent suspension in which there is arranged between the superstructure and the rubber sandwich a wedge which is adjustable to vary the pre-loading of the rubber sandwich in compression.

The invention further consists in that the said wedge has a pair of broad angle faces for coarse adjustment and a pair of narrow-angle faces for subsequent fine adjustment.

The latter feature of the invention is useful in particular in that it facilitates dismantling of the suspension.

The following description relates to the drawing accompanying the provisional specification which shows by way of example only an embodiment of the invention. This drawing is an elevational view of an independent suspension, viewed from the front of a passenger omnibus upon which it is mounted.

In the drawing, a wheel-hub-carrying member 11 is connected to the vehicle chassis or superstructure 12 by a pair of upper links 13 and a pair of lower links 14 pivoted at their outer ends respectively to the upper end 15 and the lower end 16 of the hub-carrying member 11 and at their inner ends to the vehicle chassis or superstructure 12. A rubber sandwich 17 built up from rubber sandwich elements 18 each comprising alternate rubber blocks 19 with non-resilient interleaves 20 and end plates 21, bonded together, is interposed between member 11 and an abutment wedge 22 next to the chassis 12. Between the adjacent end plates 21 of the rubber sandwich elements 18 a constraining arm 23 is interposed which at its upper end, extending beyond the top surface of the sandwich 17, is pivotally connected to the upper links 13 in order to restrain the tendency for the interleaves 20 to cant or turn under load out of parallelism with the mounting plates. The sandwich 17 abuts a flat face on member 11 and a flat face of wedge 22 is held therebetween under compression applied to the sandwich by wedge 22 as later described. The arm 23 is attached to the end plates 21 which abut the arm.

The abutment wedge 22, being in the form of a wedge-shaped block, is vertically adjustable with respect to the chassis 12. This enables the height of the rubber sandwich at that end to be varied and so the angular relationship between the links 13 and 14 and the hub-carrying member 11 for a given loading to be altered. This adjustment may be used for the initial setting of the suspension and for re-adjustment, for example, due to creep of the rubber. When the weight of the vehicle has been taken off the wheels and the constraining arm 23 disconnected from the link 13, provided that adequate adjustment is available, the abutment 22 may be raised sufficiently to remove all load from the rubber sandwich which may then be removed without dismantling the linkage.

The vertical height of the wedge 22 relative to the superstructure 12 is adjustable by a steady screw 24.

The adjustment wedge 22 and the surfaces co-operating therewith are shaped so that the wedge has two degrees of adjustment, one coarse and one fine. Thus while the outer face 25 of the wedge, and the co-operating face 26 of the rubber sandwich end plate 21 are planar; the inner face of the wedge has a part 27 which forms a broad angle with the face 25 and a part 28 which forms a narrow angle with the face 25. The part 27 co-operates with a face 29 on the chassis or superstructure 12; and the part 28 co-operates with a face 30 on the chassis 12.

In assembling the suspension one proceeds firstly to allow the wheel-hub-carrying member 11 to drop under its own weight to a position below that shown in the drawing, and then one inserts the outer one of the two rubber sandwich elements 18 together with the intermediate constraining arm 23. The adjustment wedge 22 is put in at its topmost position, the steady screw 24 being right back. Thereupon the other rubber sandwich element 18 is fitted.

The steady screw 24 is screwed downwardly to lower the adjustment wedge 22. In the first part of this movement the wedge rides with its broad-angle face 27 contacting the face 29 on the chassis, so that the wedge has a substantial horizontal component of bodily movement and the tightening of the rubber sandwich 17 is rapid. Afterwards it is the narrow-angle face 28 which contacts vertical face 30 on the chassis, so that the wedge itself has no horizontal component of movement, and the horizontal tightening of the sandwich 17 is wholly that due to the angle of inclination of the outer face 25 to the vertical.

When the wedge is set as desired, the steady screw 24 is locked by a lock nut 31.

The final setting of the rubber spring 17 is made when the vehicle is completely assembled, and fine adjustment of the wedge 22 serves to give the correct chassis height. Should creep subsequently occur, further adjustment can readily be made.

Again, these coarse and fine angles on the wedge are useful for enabling dismantling to be readily effected. With a normal or single-angle wedge the rubber spring cannot be completely released unless there is a certain amount of shear relative to compression: if even when the shear has been completely released there remains some degree of compression in the rubber spring, then no further movement of the wedge can be effected in the upward direction except by the application of a positive force in that sense, and for this purpose the adjustment screw 24 will not suffice as it acts only downwardly. The double-angle wedge on the other hand allows the spring to become completely free with clearance for drawing it out of a shallow socket or off dowels.

What I claim is:

1. An independent suspension for the wheels of a vehicle comprising a frame, a linkage pivoted to the frame for vertical movement, a wheel-hub-carrying member pivoted to the linkage, the pivotal axes of the linkage being parallel, a rubber sandwich one end of which is connected to the frame and the other end of which is connected to said member, co-operating surfaces on said frame and said one end of the rubber sandwich, a wedge between said co-operating surfaces and means for adjusting the wedge relatively to the rubber sandwich and the frame thereby to vary the compressive force on the rubber sandwich, a steep-angled surface on one side of the wedge, a shallow-angled surface on the other side of the wedge and a non-inclined face on said side of the wedge having the steep-angled surface, adjustment of the wedge by said means producing coarse variation in the compressive force on the sandwich by simultaneous action of both inclined surfaces and producing fine variation in said force by simultaneous action of the shallow-angled surface and the non-inclined face.

2. An independent suspension for the wheels of a vehicle comprising a frame, a linkage pivoted to the frame for vertical movement, a wheel-hub-carrying member pivoted to the linkage, the pivotal axes of the linkage being parallel, a rubber sandwich one end of which is connected to the frame and the other end of which is connected to said member, co-operating surfaces on said frame and said one end of the rubber sandwich, a wedge between said co-operating surfaces and means for adjusting the wedge relatively to the rubber sandwich and the frame thereby to vary the compressive force on the rubber sandwich, a pair of steep-angled surfaces on the side of the wedge which engages the frame, a non-inclined face separating said pair of surfaces in the direction of adjustment of the wedge and a shallow-angled surface on the side of the wedge which engages the rubber sandwich, adjustment of the wedge by said means producing coarse variation in the compressive force on the sandwich by simultaneous action of both inclined surfaces and producing fine variation of said force by simultaneous action of the shallow-angled surface and the non-inclined face.

3. An independent suspension of the wheels of a vehicle comprising a frame, a pair of upper links and a pair of parallel lower links each pivoted to the frame for vertical movement, a wheel-hub-carrying member pivoted to the upper and lower pair of links, the pivotal axes of all the links being parallel, a rubber sandwich one end of which is connected to the frame and the other end of which is connected to said member, co-operating surfaces on said frame and said one end of the rubber sandwich, a wedge between said co-operating surfaces and means for adjusting the wedge relatively to the rubber sandwich and the frame thereby to vary the compressive force on the rubber sandwich, a steep-angled surface on one side of the wedge, a shallow-angled surface on the other side of the wedge and a non-inclined face on said side of the wedge having the steep-angled surface, adjustment of the wedge by said means producing coarse variation in the compressive force of the sandwich by simultaneous action of both inclined surfaces and producing fine variation thereof by simultaneous action of the shallow-angled surface and the non-inclined face.

4. An independent suspension for the wheels of a vehicle comprising a frame, pair of upper links and a pair of parallel lower links each pivoted to the frame for vertical movement, a wheel-hub-carrying member pivoted to the upper and lower pair of links, the pivotal axes of all the links being parallel, a rubber sandwich comprising alternate rubber blocks with non-resilient interleaves and end plates bonded together one end of which sandwich is connected to the frame and the other end of which sandwich is connected to said member, co-operating surfaces on said frame and said one end of the rubber sandwich, a wedge between said co-operating surfaces and means for adjusting the wedge relatively to the rubber sandwich and the frame thereby to vary the compressive force on the rubber sandwich, a steep-angled surface on one side of the wedge, a shallow-angled surface on the other side of the wedge and a non-inclined face on said side of the wedge having the steep-angled surface, adjustment of the wedge by said means producing coarse variation of the compressive force on the sandwich by simultaneous action of both inclined surfaces and producing fine variation thereof by simultaneous action of the shallow-angled surface and the non-inclined face.

5. An independent suspension as claimed in claim 4 in which a plate is provided between adjacent blocks and secured thereto and said intermediate plate is pivoted to the upper links to hold the interleaves from canting under load.

References Cited in the file of this patent

UNITED STATES PATENTS

| | | |
|---|---|---|
| 1,251,930 | Sherman | Jan. 1, 1918 |
| 2,212,769 | Boxan | Aug. 27, 1940 |

FOREIGN PATENTS

| | | |
|---|---|---|
| 545,704 | Great Britain | June 9, 1942 |
| 648,516 | Great Britain | Jan. 3, 1951 |
| 909,533 | Germany | Apr. 22, 1954 |